United States Patent [19]
Brown et al.

[11] 3,971,159

[45] July 27, 1976

[54] TREATMENT OF CONIFERS

[75] Inventors: Claud Lafayette Brown, Watkinsville, Ga.; Herman Isaac Enos, Jr., Pennsbury Township, Chester County, Pa.

[73] Assignee: Hercules Incorporated, Wilmington, Del.

[22] Filed: Feb. 5, 1975

[21] Appl. No.: 547,310

[52] U.S. Cl. .................................. 47/10; 47/57.5
[51] Int. Cl.² .................. A01G 23/10; A01G 29/00
[58] Field of Search ........... 128/268, 270, 295, 296; 47/57.5, 10

[56] References Cited
UNITED STATES PATENTS

| | | | |
|---|---|---|---|
| 1,682,760 | 9/1928 | Laffin | 47/57.5 |
| 1,727,939 | 9/1929 | Renner | 47/57.5 |
| 2,389,870 | 11/1945 | Reevely | 47/57.5 |
| 2,712,202 | 7/1955 | Hosler et al. | 47/57.5 |
| 2,877,767 | 3/1959 | Kramer | 128/270 |
| 2,996,841 | 8/1961 | Loree | 47/57.5 X |
| 3,022,604 | 2/1962 | Greth et al. | 47/10 |
| 3,086,527 | 4/1963 | Forrest | 128/270 X |
| 3,839,823 | 10/1974 | Roberts et al. | 47/57.5 X |

*Primary Examiner*—Robert E. Bagwill
*Attorney, Agent, or Firm*—Charles L. Board

[57] ABSTRACT

Disclosed is a method of preparing a treatment site on the bole of a conifer.

18 Claims, 8 Drawing Figures

TREATMENT OF CONIFERS

This invention relates to a method of preparing a treatment site on the bole of a living conifer.

It is known to chemically induce deposition of oleoresin in a living conifer such, for example, as a slash pine by preparing a treatment site on the bole thereof and subsequently applying thereto an aqueous solution of a treating chemical such as a substituted bipyridylium salt. See U.S. Pat. No. 3,839,823 of Oct. 8, 1974, reference to which is hereby made.

Sapwood of a conifer has long vertical cells in which sap moves up the bole. These vertical cells are crossed at right angles by ray cells. Ray cells are shorter than vertical cells and are used for conveying food across the conifer to where it is needed. Treatment sites are prepared so that when a solution of treating chemical is applied it wll make contact with both the vertical cells and with the ray cells.

Heretofore, treatment sites have been prepared by removing a small section of bark to expose sapwood; or by making an axe cut deep enough to expose sapwood; or by boring a small downwardly sloping hole into the sapwood. Application of solution of treating chemical to the above treatment sites is made by any convenient means such, for example, as by use of a sprayer or a brush. With regard to the treatment site prepared by boring a downwardly sloping hole into the sapwood, the solution is applied by pouring it into the hole.

In accordance with this invention there is provided a novel method for preparing a treatment site on the bole of a living conifer.

The method of treatment site preparation comprises providing on the sapwood of a living conifer anywhere from ground level to a height of about 10 feet above ground level at least one elongated downwardly sloping hole and subsequently inserting into the hole an absorbent fibrous material for receipt of a treating chemical. The treating chemical will usually be applied in the form of a solution thereof in a suitable solvent, water preferably. The absorbent fibrous material functions as a wick and provides for highly effective movement of the solution of treating chemical into the conifer. If desired, the treating chemical, alone or in solution, can be applied to the absorbent fibrous material prior to insertion of the fibrous material into the prepared hole.

For the purposes of the description of this invention that the section of the living conifer defined by two planes, each at a right angle to the axis of the conifer, one at ground level and the other at a height of about 10 feet above ground level, is considered a cylinder.

The axis of the elongated hole, which has an entry end (sometimes referred to herein as "axis entry end") and a terminal end (sometimes referred to herein as "axis terminal end"), is at an angle of from about 5° to about 45° to a plane perpendicular to the conifer axis. This angle is referred to hereinafter as the "vertical angle". The preferred vertical angle is about 30°.

The axis of the elongated hole will also be at an angle of from about 20° to about 45° to a radial plane that includes the axis entry end. This angle is referred to hereinafter as the "horizontal angle". The axis terminal end terminates within the bole; that is, the elongated hole does not go completely through the bole.

Deposition of chemically induced oleoresin takes place in the sapwood of a sector of the bole bounded by two radial planes, one of which includes the axis entry end, hereinafter referred to as "EEIRP" or "entry end included radial plane", and one of which includes the axis terminal end hereinafter referred to as "TEIRP" or "terminal end included radial plane"; such sector of the bole being referred to hereinafter in the specification and in the claims as "deposition sector". The angle formed by the EEIRP and the TEIRP is referred to hereinafter in the specification and the claims as the "sector angle".

As hereinafter set forth, and in accordance with this invention, one additional treatment site can be introduced into the bole of a living conifer to provide two deposition sectors; or two additional treatment sites can be introduced to provide three deposition sectors.

Thus, a second deposition sector can be provided in the bole of a tree by preparing a second treatment site on the bole outside the first deposition sector. The second treatment site hole will have a vertical angle and a horizontal angle such that there is no overlap of the two deposition sectors. When two deposition sectors are provided in the bole of a tree, it is recommended that the sector angle of each be about the same number of degrees.

In addition, a third deposition sector can be provided in the bole of a tree by preparing a third treatment site on the bole outside the first deposition sector and outside the second deposition sector. Each treatment site will comprise an elongated hole having a vertical angle and a horizontal angle such that there will be no overlap of any of the three deposition sectors. It is preferred that the sector angle of each of the three deposition sectors be about the same number of degrees.

When a bole is provided with two or three deposition sectors, it is preferred that the total of the sector angles be as near 180° as possible; and also, that each deposition sector be separated from its adjacent deposition sector as much as possible.

When a bole is provided with just one deposition sector, the horizontal angle of the treatment site hole will preferably be from about 20° to about 30° and the sector angle will preferably be at about 110° to about 135°. The most preferred sector angle will be about 135°.

When a bole is to be provided with two deposition sectors, the distance between the axis entry end of one hole and the axis entry end of the other hole will preferably be about 90°.

When a bole is prepared with three deposition sectors, it is preferred that each sector angle be about 60° and that the distance between adjacent deposition sectors be about equal. The horizontal angle of the elongated hole axis of each treatment site will preferably be about 30°, and the distance between adjacent axis entry ends will preferably be about 120°.

A treatment site defining a specific deposition sector can be duplicated one or more times above or below its location on the bole if desired to distribute treating chemical within the deposition sector thereby increasing oleoresin deposition within the deposition sector.

A treatment site is easily and readily prepared by first boring a hole in the bole of a living conifer at the desired angles and desired length with appropriate apparatus or tool for boring holes such as a drill, auger or the like of appropriate cross-sectional diameter. Appropriate apparatus will be that which provides preferably a cylindrical elongated hole having a diameter of about ¼ inch to about 1 inch and preferably from about ⅜ inch to about ⅝ inch. Subsequently, the elongated hole is filled with the absorbent fibrous material which functions as a wick for movement of a solution of treating chemical into the conifer.

Absorbent fibrous materials useful in this invention are the absorbent natural fibers such as keratin fibers, wool for example; silk fibers; and cellulosic fibers, cotton for example. If desired the absorbent fibrous material can be comprised of two or more natural fibers in admixture. Loose fibers (unsheeted) can be used; and sheet material (woven and non-woven) such as paper sheeting can be used. Man-made fibers, such as polyester fibers and nylon fibers, can be used in association with one or more of the natural fibers, if desired. Thus, for example, a woven fabric consisting of cotton fibers and polyester fibers can be employed.

Preferred absorbent fibrous material will consist essentially of cellulosic fibers such as wood pulp fibers, cotton fibers, and regenerated cellulosic fibers (rayon).

Once the treatment site has been prepared, it is ready for receipt of treating chemical, preferably in the form of a solution thereof in water, which can be applied to the absorbent fibrous material in any convenient manner. Thus, a syringe with needle long enough to reach the bottom of the elongated hole can be used. If desired the solution can be poured onto the absorbent fibrous material from any suitable container. Also the solution can be applied by means of a sprayer. In addition, the absorbent fibrous material, before insertion into the elongated hole, can be impregnated by known means with treating chemical in dry form (the substituted bipyridylium salt). After insertion of the impregnated fibrous material, water can be applied by any convenient means, such as by means of a syringe, to dissolve the dry treating chemical to provide an aqueous solution thereof. If desired, the treating chemical, in the form of a solution thereof, can be applied to the absorbent fibrous material prior to insertion into the prepared hole.

Once the treating chemical has been applied, it is preferred that the hole be sealed or closed to prevent loss of treating chemical and also to help protect the living conifer from infestation by insects, fungus, and the like. The hole can be sealed or closed by any suitable means and is within the skill of the art. Thus, for example, the hole can be closed by plugging with a cork, wooden plug, a plastic plug, or a rubber plug. In addition, the hole can be sealed by use of a sealant such as wax.

Chemicals used to induce oleoresin deposition are a class of substituted bipyridylium (bipyridinium) salts (see U.S. Pat. No. 3,839,823). Example of such treating chemicals are

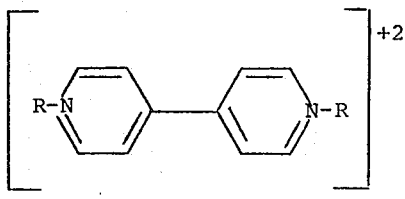

and

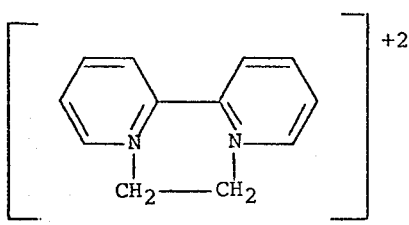

where $n = 1$ or 2, $y = 1$ or 2, and $n \times y = 2$ and R = $CH_3-$, $CH_3CH_2-$, $CH_3CH_2CH_2-$,

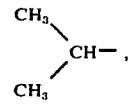

and higher aliphatic alkyl groups, either straight chain or branched; and X is any anion that makes the compound water soluble such as, but not limited to, the following:

| | |
|---|---|
| $Cl^-$ | (chloride) |
| $Br^-$ | (bromide) |
| $F^-$ | (fluoride) |
| $I^-$ | (iodide) |
| $SO_4^-$ | (sulfate) |
| $NO_3^-$ | (nitrate) |
| $OH^-$ | (hydroxyl) |
| $CH_3SO_4^-$ | (methyl sulfate) |

The aqueous solution of treating chemical is absorbed into the ray cells and the vertical cells resulting in the production of oleoresin.

The solution is made by dissolving a predetermined amount of the treating chemical in water. Since some of the chemicals are commercially available as aqueous solutions, the only preparation may involve further dilution by the addition of water.

Once applied in the form of an aqueous solution, the chemical is mobile and may be carried to distant areas within the living conifer. The chemical continues to induce oleoresin production wherever it is located.

Figure 1:
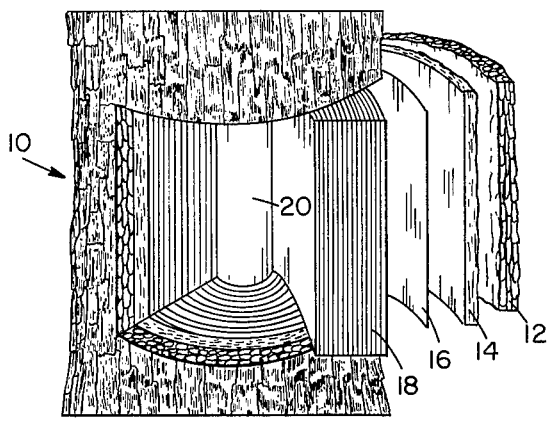
FIG. 1 shows the layers of a conifer to be treated.

Referring now to FIG. 1 of the drawing there are shown four distinct layers of a living conifer 10, each of which plays a particular role in the life of the conifer. Outer bark 12 insulates the conifer from extreme heat and cold, helps to keep out rain, and protects the conifer against insects. Phloem 14 conducts food from leaves (needles of a conifer are leaves) to the rest of the conifer. Cambium layer 16 produces new bark and new wood annually in response to hormones that stimulate the growth of cells. Sapwood 18 is the pipeline for water moving from roots to the leaves. When its inner cells lose their vitality, they turn into heartwood. Heartwood 20 is the central supporting column of a mature conifer. Although it is dead, it will not decay or lose strength as long as the outer layers of the conifer remain intact.

While heartwood is present in mature conifers the preferred conifers for treatment in accordance with this invention are of an age or maturity such that there is very little, if any, heartwood present. Thus, the interior portion of the conifer adjacent the cambium layer will consist essentially of sapwood. The conifers preferred for treatment in this invention will be about 5 years to about 60 years old, will be over 30 feet tall, and will have a cross-sectional outer diameter of at least about 5 inches at breast-height.

Figure 2:
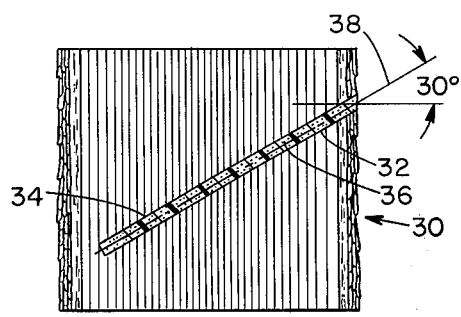

FIG. 2 of the drawing is a view in section of a bole section 30 of a conifer showing a single treatment site 32. Treatment site 32 consists of elongated hole 34 filled with fibrous material 36. FIG. 2 shows axis 38 of the elongated hole 34 at its preferred vertical angle of 30°.

Figure 3:
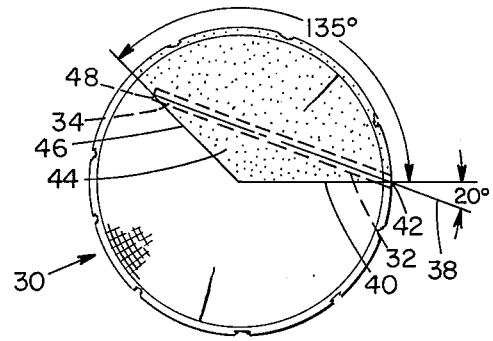
FIGS. 2–4 show a single treatment site.

FIG. 3 shows the axis 38 of elongated hole 34 at its preferred angle of 20° to entry end included radial plane 40 that includes axis entry end 42 of the elongated hole axis 38. As shown, elongated hole 34 is of a length such that the sector angle of deposition sector 44 is 135°. Deposition sector 44 is that area included by entry end included radial plane 40 and terminal end included radial plane 46. TEIRP 46 includes axis terminal end 48 of axis 38.

Figure 4:
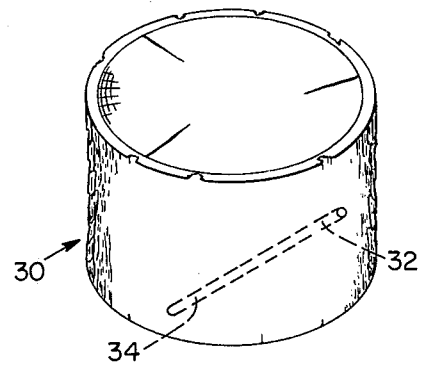

FIG. 4 is a view in perspective of bole 30 showing the treatment site 32 which includes elongated hole 34.

Figure 5:
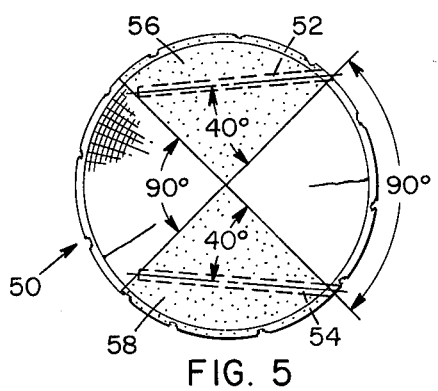
FIGS. 5 and 6 show the use of two treatment sites.
Figure 6:
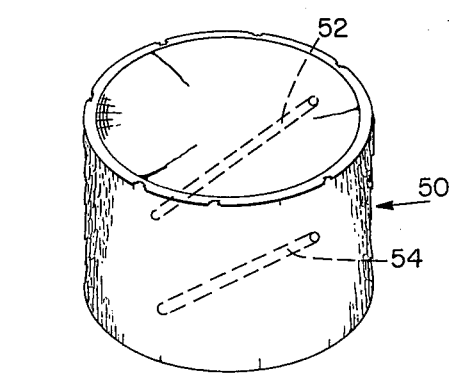

FIG. 5 and FIG. 6 of the drawing are similar to FIG. 3 and FIG. 4 respectively and show the preferred embodiment when two treatment sites are employed to provide two deposition sectors. Shown in the bole section 50 are two treatment sites 52 and 54. A deposition sector 56 having a sector angle of 90° is created by treatment site 52 and a deposition sector 58 having a sector angle of 90° is created by treatment site 54. While not shown, the axis of the elongated hole of each treatment site will be at its preferred vertical angle of about 30°. Each horizontal angle, as shown, is 40°.

Figure 7:
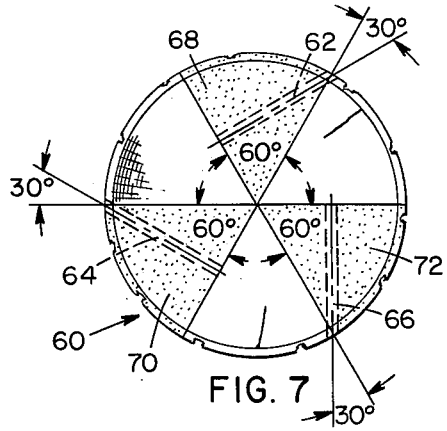
FIGS. 7 and 8 show the use of three treatment sites.
Figure 8:
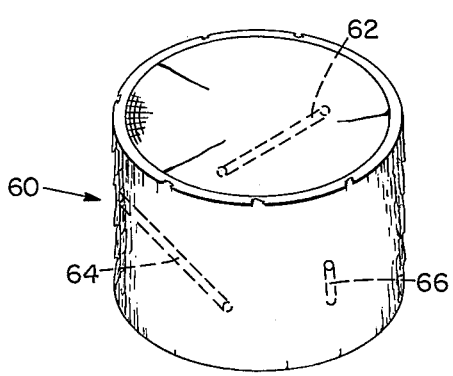

FIG. 7 and FIG. 8 of the drawing are similar to FIG. 3 and FIG. 4 of the drawing, respectively and show the preferred embodiment when three treatment sites are employed to provide three treatment sectors. Shown in bole section 60 are three treatment sites 62, 64, 66 which provide respectively, deposition sectors 68, 70 and 72, each deposition sector having a sector angle of 60°. While not shown, the axis of the elongated hole of each treatment site will be at its preferred vertical angle of about 30°. Each horizontal angle, as shown, is 30°.

The following examples are illustrative of the invention.

EXAMPLE 1

Six conifers in each of two locations in Australia, were prepared for treatment and treated in the month of April. The conifers were Pinus elliottii (slash pine) and had an average diameter of about 8 inches. Two elongated holes were drilled from the same side of each tree at a vertical angle of about 30° and at a height of about 2½ feet above ground level. Each hole had a cross-sectional diameter of about ½ inch. The horizontal angle of each hole was about 30°. Each elongated hole had a length of about four (4) inches and was separated from the other by about 90°. Essentially identical elongated holes were drilled on the conifer bole at a distance of about 3 feet above the first drilled holes.

Absorbent fibrous material was placed in each hole to provide a treatment site. In this example two 1½ inch tampons of regenerated cellulose (Tampax tampons) were placed in each elongated hole. Having thus prepared the treatment sites, a 0.3% by weight aqueous treating solution of 1,1'-dimethyl-4,4'-bipyridylium dichloride was applied to each treatment site. Each conifer averaged about 40 ml. of this treating solution. A five-foot section was cut from one tree in each location in November of the same year treatment was made. The 5 foot section was cut at about 1½ feet above ground level and about 6½ feet above ground level. It was found that each section contained from 2.5 to 3.5 times its normal content of rosin.

EXAMPLE 2

Fifty conifers were treated in the manner set forth below in each of two locations. The conifers treated were Pinus elliottii (slash pine). One location was in Mississippi and the conifers of this location were treated in July. The other location as in Louisiana and the conifers of this location were treated in August.

Each tree was provided with three treatment sites as shown in FIGS. 7 and 8 of the drawing. The three elongated holes were bored into each tree at approximately three feet above ground level, with the entrance point of each elongated hole being located equidistant in a horizontal plane. A ½ inch auger was used to bore the elongated holes. Each hole was bored at a vertical angle of about 30° and at a horizontal angle of about 30°. Each elongated hole had length such that the sector angle of each deposition sector was about 60°. Each hole was subsequently filled with one or more tampons, leaving enough space at the entry end for a cork plug. The tampons used are comprised of fibers of regenerated cellulose and are available commercially under the proprietary designation Tampax.

The tampons were then saturated from the lower end of the hole up to the entrance with a 0.3% by weight aqueous treating solution of 1,1'-dimethyl-4,4'-bipyridylium dichloride by means of a syringe (also used to measure the solution applied) attached to a needle which was inserted to the lower end of the hole. The hole was then sealed with a ½ inch cork (No. 4) driven with a hammer. The amount of aqueous treating solution applied averaged about 39 milliliters per conifer.

In May of the year following the year of treatment, three-foot sections were cut from several of the treated conifers at each location. Each section was cut at about 2 feet above ground level and at about 5 feet above ground level. It was determined that the treatment was effective in increasing the oleoresin content of the conifers over that of untreated conifers.

By use of the treatment sites prepared in accordance with this invention, there results better distribution of treating solution and better response thereto by the conifer with a corresponding increase in yield of rosin. In addition, there is a minimum disturbance of the phloem and hence the lifetime of the conifer is maintained for a longer period of time and infestation of the conifer by pest, fungus, and the like is minimized.

While the above description has been directed to the use of the treatment sites of this invention for receipt of specific treating chemicals that will induce oleoresin deposition in a conifer, it is to be understood that the treatment sites can be used for receipt of other treating chemicals that will induce oleoresin deposition. Also, the treatment sites can be used, if desired, for the application to conifers of other treating chemicals such, for example, as systemic insecticides.

It is to be understood that the above description and drawing are illustrative of this invention and not in limitation thereof.

What I claim and desire to protect by Letters Patent is:

1. In the method of applying a treating chemical to a living conifer wherein the conifer is provided with a treatment site on the bole thereof, the improvement which comprises preparing a treatment site by cutting into sapwood of the conifer one elongated hole and inserting into the hole absorbent fibrous material to carry said treating chemical, the axis of said elongated hole having a vertical angle of from about 5° to 45° and a horizontal angle of from about 20° to about 30°, the hole being of a length sufficient to provide a sector angle of from about 110° to about 135°.

2. The method of claim 1 wherein the vertical angle is about 30°, the horizontal angle is about 20°, and the sector angle is about 135°.

3. The method of claim 2 wherein treating chemical is applied to the absorbent fibrous material prior to insertion of the fibrous material into the hole.

4. The method of claim 1 wherein treating chemical is applied to the absorbent fibrous material prior to insertion of the fibrous material into the hole.

5. In the method of applying a treating chemical to a living conifer wherein the conifer is provided with treatment sites on the bole thereof, the improvement which comprises preparing two treatment sites by cutting into sapwood of the conifer a first and a second elongated hole and placing in each hole absorbent fibrous material to carry said treating chemical, the axis of each hole having a vertical angle of from about 5° to 45° and a horizontal angle of from about 30° to about 40° and the length of the elongated holes being sufficient to provide sector angles such that the total thereof will be at least about 180°, there being no overlap of the sector angles.

6. The method of claim 5 wherein the vertical angle is about 30°, the horizontal angle is about 40°, and the distance between axis entry ends is about 90°.

7. The method of claim 6 wherein treating chemical is applied to the absorbent fibrous material prior to insertion of the fibrous material into the hole.

8. The method of claim 5 wherein treating chemical is applied to the absorbent fibrous material prior to insertion of the fibrous material into the hole.

9. In the method of applying a treating chemical to a living conifer wherein the conifer is provided with treatment sites on the bole, the improvement which comprises preparing three treatment sites by cutting into sapwood of the conifer three elongated holes and placing in each hole absorbent fibrous material to carry said treating chemical, the axis of each hole having a vertical angle of from about 5° to 45°, a horizontal angle of about 30°, the distance between adjacent axis entry ends being about 120°, each elongated hole being of a length such that each sector angle will be about 60°.

10. The method of claim 9 wherein the vertical angle is about 30°.

11. The method of claim 10 wherein treating chemical is applied to the absorbent fibrous material prior to insertion of the fibrous material into the hole.

12. The method of claim 9 wherein treating chemical is applied to the absorbent fibrous material prior to insertion of the fibrous material into the hole.

13. In the method of chemically inducing deposition of oleoresin in a living conifer by preparing a treatment site on the bole thereof and applying an aqueous solution of substituted bipyridylium salt to the prepared treatment site, the improvement which comprises preparing a treatment site by cutting into sapwood of the conifer one elongated hole and placing in the hole absorbent fibrous material for receipt of an aqueous solution of substituted bipyridylium salt, the axis of said elongated hole having a vertical angle of from about 5° to 45° and a horizontal angle of from about 20° to about 30°, the hole being of a length sufficient to provide a sector angle of from about 110° to about 135°.

14. The method of claim 13 wherein the vertical angle is about 30°, the horizontal angle is about 20°, and the sector angle is about 135°.

15. In the method of chemically inducing deposition of oleoresin in a living conifer by preparing treatment sites on the bole thereof and applying an aqueous solution of substituted bipyridylium salt to the prepared treatment sites, the improvement which comprises preparing two treatment sites by cutting into sapwood of the conifer a first and a second elongated hole and placing in each hole absorbent fibrous material for receipt of an aqueous solution of substituted bipyridylium salt, the axis of each hole having a vertical angle of from about 4° to 45° and a horizontal angle of from about 30° to about 40° and the length of the elongated holes being sufficient to provide sector angles such that the total thereof will be at least about 180°, there being no overlap of the sector angles.

16. The method of claim 15 wherein the vertical angle is about 30°, the horizontal angle is about 40°, and the distance between axis entry ends is about 90°.

17. In the method of chemically inducing deposition of oleoresin in a living conifer by preparing treatment sites on the bole thereof and applying an aqueous solution of substituted bipyridylium salt to the prepared treatment sites, the improvement which comprises preparing three treatment sites by cutting into sapwood of the conifer three elongated holes and placing in each hole absorbent fibrous material for receipt of an aqueous solution of substituted bipyridylium salt, the axis of said cylindrical hole having a vertical angle of from about 5° to 45°, a horizontal angle of about 30°, the distance between adjacent axis entry ends being about 120°, each elongated hole being of a length such that each sector angle will be about 60°.

18. The method of claim 17 wherein the vertical angle is about 30°.

* * * * *